(12) United States Patent
Simpson

(10) Patent No.: US 6,270,139 B1
(45) Date of Patent: Aug. 7, 2001

(54) EXTENDABLE TAILGATE LADDER ASSEMBLY

(76) Inventor: Leon E. Simpson, 10041 Birchwood Dr., Huntington Beach, CA (US) 92646

( * ) Notice: Subject to any disclaimer, the term of this patent is extended or adjusted under 35 U.S.C. 154(b) by 0 days.

(21) Appl. No.: 09/548,243

(22) Filed: Apr. 12, 2000

(51) Int. Cl.[7] .................................. B62D 33/00
(52) U.S. Cl. ............................ 296/62; 296/26.01
(58) Field of Search ...................... 296/62, 26.01; 182/195; 280/166

(56) References Cited

U.S. PATENT DOCUMENTS

| | | | |
|---|---|---|---|
| D. 365,402 | * | 12/1995 | Jones ........................ D25/64 |
| D. 376,784 | * | 12/1996 | Miller ....................... D12/203 |
| 4,021,071 | * | 5/1977 | Norman ...................... 296/62 |
| 4,312,423 | * | 1/1982 | Helbig ....................... 182/46 |
| 4,757,876 | * | 7/1988 | Peacock ................... 296/62 X |
| 4,930,797 | * | 6/1990 | Parrill ........................ 280/166 |
| 5,205,603 | * | 4/1993 | Burdette, Jr. ............... 296/62 |
| 5,239,795 | * | 8/1993 | Breaux ........................ 52/182 |
| 5,617,930 | * | 4/1997 | Elia ......................... 296/62 X |
| 5,645,140 | * | 7/1997 | Mouneimneh ............... 182/195 |
| 5,687,813 | * | 11/1997 | Bensch ................... 280/166 X |
| 5,788,311 | * | 8/1998 | Tibbals ....................... 296/62 |
| 5,803,523 | * | 9/1998 | Clark et al. ................ 296/26.1 |
| 5,868,412 | * | 2/1999 | Hinkle ........................ 296/62 |

* cited by examiner

Primary Examiner—D. Glenn Dayoan
Assistant Examiner—Lori L. Coletta

(57) ABSTRACT

A extendable tailgate ladder assembly for providing improved accessibility for truck beds. The extendable tailgate ladder assembly includes a ladder, a pair of tracks, a pair of feet, a cover member, a plurality of first connection members and a plurality of second connection members.

9 Claims, 2 Drawing Sheets

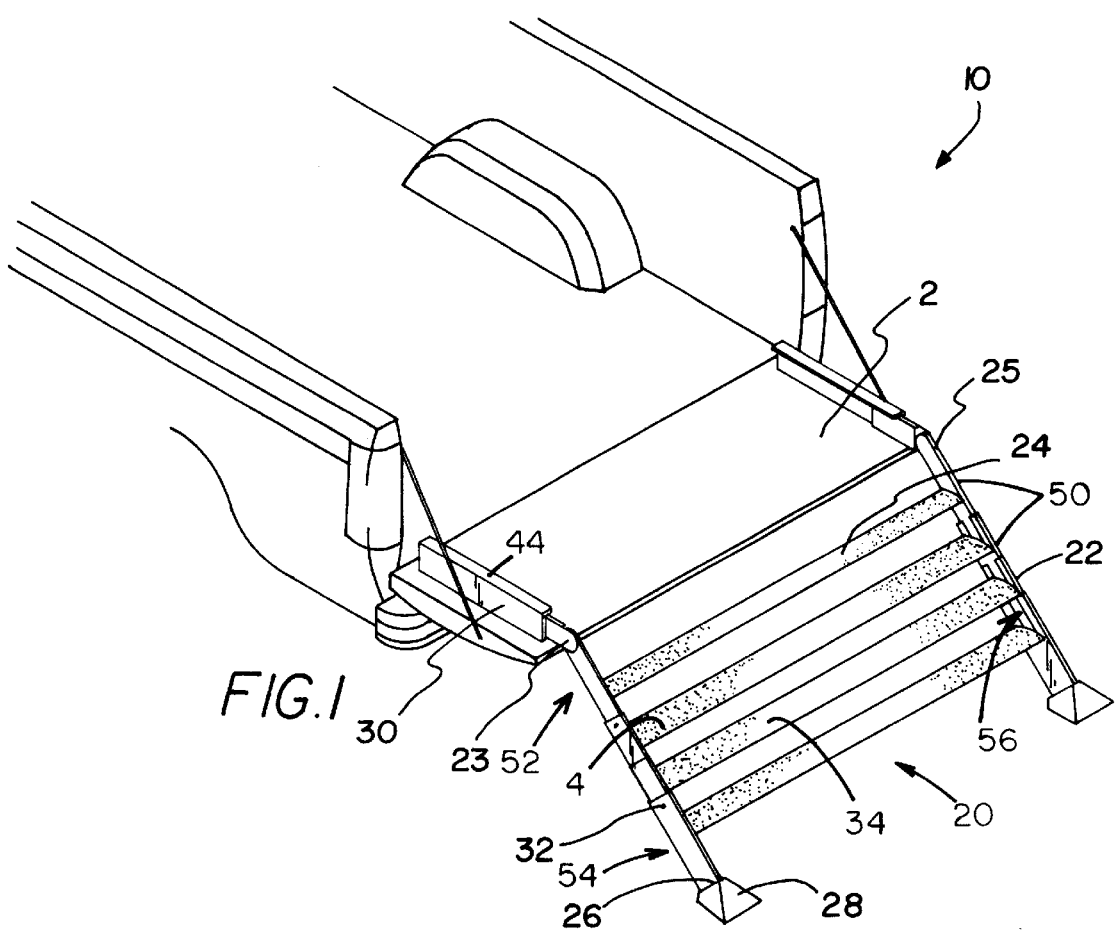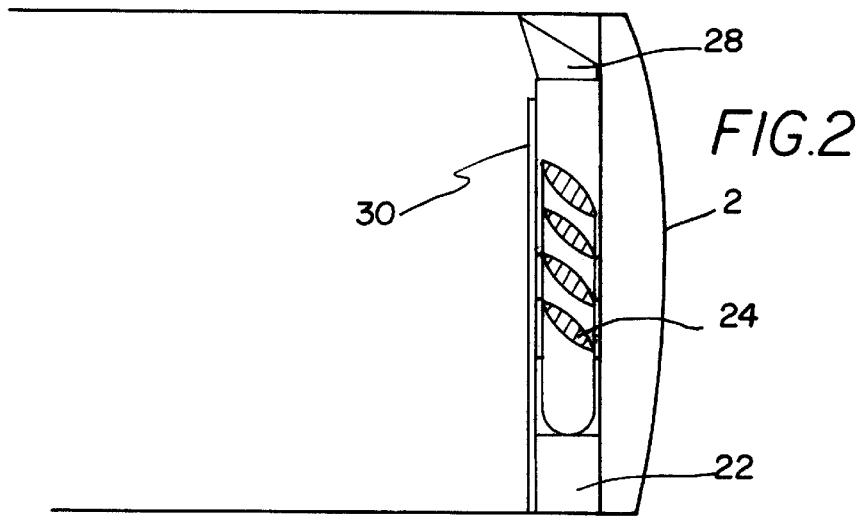

EXTENDABLE TAILGATE LADDER ASSEMBLY

BACKGROUND OF THE INVENTION

1. Field of the Invention

The present invention relates to step assemblies and more particularly pertains to a new extendable tailgate ladder assembly for providing improved accessibility for truck beds.

2. Description of the Prior Art

The use of step assemblies is known in the prior art. More specifically, step assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,757,876; U.S. Pat. No. 5,617,930; U.S. Pat. No. 4,021,071; U.S. Pat. No. 5,687,813; U.S. Pat. No. 5,205,603; and U.S. Pat. No. Des. 365,402.

While these devices fulfill their respective, particular objectives and requirements, the aforementioned patents do not disclose a new extendable tailgate ladder assembly. The inventive device includes a ladder, a pair of tracks, a pair of feet, a cover member, a plurality of first connection members and a plurality of second connection members.

In these respects, the extendable tailgate ladder assembly according to the present invention substantially departs from the conventional concepts and designs of the prior art, and in so doing provides an apparatus primarily developed for the purpose of providing improved accessibility for truck beds.

SUMMARY OF THE INVENTION

In view of the foregoing disadvantages inherent in the known types of step assemblies now present in the prior art, the present invention provides a new extendable tailgate ladder assembly construction wherein the same can be utilized for providing improved accessibility for truck beds.

The general purpose of the present invention, which will be described subsequently in greater detail, is to provide a new extendable tailgate ladder assembly apparatus and method which has many of the advantages of the step assemblies mentioned heretofore and many novel features that result in a new extendable tailgate ladder assembly which is not anticipated, rendered obvious, suggested, or even implied by any of the prior art step assemblies, either alone or in any combination thereof.

To attain this, the present invention generally comprises a ladder, a pair of tracks, a pair of feet, a cover member, a plurality of first connection members and a plurality of second connection members.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new extendable tailgate ladder assembly apparatus and method which has many of the advantages of the step assemblies mentioned heretofore and many novel features that result in a new extendable tailgate ladder assembly which is not anticipated, rendered obvious, suggested, or even implied by any of the prior art step assemblies, either alone or in any combination thereof.

It is another object of the present invention to provide a new extendable tailgate ladder assembly which may be easily and efficiently manufactured and marketed.

It is a further object of the present invention to provide a new extendable tailgate ladder assembly which is of a durable and reliable construction.

An even further object of the present invention is to provide a new extendable tailgate ladder assembly which is susceptible of a low cost of manufacture with regard to bother materials and labor, and which accordingly is then susceptible of low prices of sale to the consuming public, thereby making such extendable tailgate ladder assembly economically available to the buying public.

Still yet another object of the present invention is to provide a new extendable tailgate ladder assembly which provides in the apparatuses and methods of the prior art some of the advantages thereof, while simultaneously overcoming some of the disadvantages normally associated therewith.

Still another object of the present invention is to provide a new extendable tailgate ladder assembly for providing improved accessibility for truck beds.

Yet another object of the present invention is to provide a new extendable tailgate ladder assembly which includes a ladder, a pair of tracks, a pair of feet, a cover member, a plurality of first connection members and a plurality of second connection members.

Still yet another object of the present invention is to provide a new extendable tailgate ladder assembly that reduces the bending, stretching, lifting at awkward angles common to accessibility with normal tailgates and therefore may reduce injuries.

Even still another object of the present invention is to provide a new extendable tailgate ladder assembly that stores in a compact hidden state when not in use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new extendable tailgate ladder assembly according to the present invention.

FIG. 2 is a schematic cross-sectional view of the present invention, in the retracted position.

DESCRIPTION OF THE PREFERRED EMBODIMENT

Figure 3:
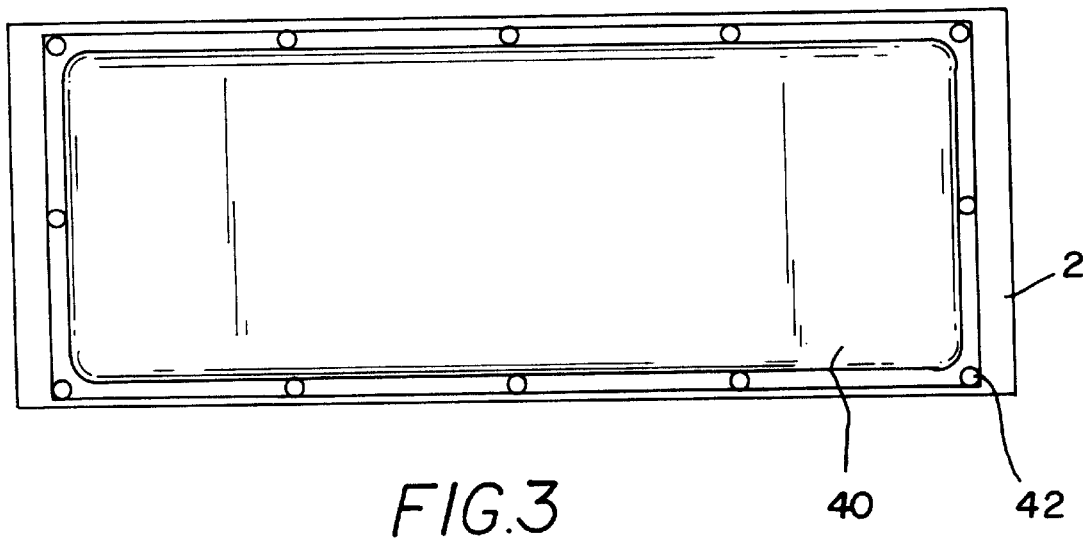
FIG. 3 is a schematic view of the cover member of the present invention.

With reference now to the drawings, and in particular to FIGS. 1 through 3 thereof, a new extendable tailgate ladder assembly embodying the principles and concepts of the present invention and generally designated by the reference numeral 10 will be described.

As best illustrated in FIGS. 1 through 3, the extendable tailgate ladder assembly 10 generally comprises a ladder 20, a pair of tracks 30, a pair of feet 28, a cover member 40, a plurality of first connection members 42 and a plurality of second connection members 44.

The ladder 20 has a pair of opposite side rails 22 and a plurality of rungs 24 extending between the side rails 22.

The pair of tracks 30 is designed to couple to the tailgate 2 of the vehicle. Each of the rails 22 is slidably insertable into an associated track 30. The sliding of the rail 22 with respect to the track 30 serves to extend or retract the side rails 22 with respect to the tailgate 2.

A first end 25 of each of the side rails 22 is pivotally coupled to an associated track connection portion 23. This allows the ladder 20 to be pivoted such that a second end 26 of each of the side rails 22 is positionable to rest on a support surface below the tailgate 2. With the second end 26 of the side rail 22 resting on a support surface, the rungs 24 form a plurality of steps between the support surface and the tailgate 2.

The pair of feet 28 are each coupled to an associated second end 26 of the side rails 22.

Each of the rungs 24 has a generally arcuate upper surface. This allows the uppermost portion of the upper surface to be positioned substantially horizontal throughout a range of angles between the tailgate 2 and the ladder 20, when the ladder 20 is pivoted relative to the tailgate 2. The upper surface of the rungs 24 is covered by a gripping material 4 to prevent slipping on the rungs 24.

Each of the side rails 22 is telescopic for extending a length of the ladder 20.

Each of the side rails 22 has a plurality of telescopic portions 50. Each of the telescopic portions 50 is slidably engaged to each adjacent telescopic portion 50 such that each of the side rails 22 is extendable. Illustratively, as shown in FIGS. 1 and 2, the telescopic portions 50 each may have a notch for receiving the rung of an adjacent telescopic portion 50 when the side rails 22 are moved into a collapsed position.

Each of the rungs 24 has a connection portion 23 which is coupled to an interior face of an associated one of the side rails 22.

The plurality of telescopic portions 50 includes a pair of proximal telescopic 52 portions. Each proximal telescopic portion 52 is pivotally coupled to an associated one of the connection portions 23.

The plurality of telescopic portions 50 includes a plurality of outer telescopic portions 54. Each telescopic portion 54 has a generally C-shaped cross-section which allows the outer telescopic portions 54 to be slidable relative to each other. This C-shaped cross section allows the connection portions 23 of the rungs 24 to be slidable within a gap 56 formed by opposite edges of the outer telescopic portions 54.

Each of the outer telescopic portions includes a locking pin mechanism 32 for engaging a selectable one of a plurality of holes in an adjacently positioned telescopic portion 50, which locks the two telescopic portions 50 into a static position relative to each other.

The cover member 40 has an outer perimeter portion designed for abutting the tailgate 2 such that the cover member 40 is positionable over the ladder 20 when the ladder 20 is in the fully retracted position.

The plurality of first connection members 42 are coupled to the outer perimeter portion of the cover member 40.

The plurality of second connection members 44 are designed for coupling to the tailgate 2 of the vehicle such that each of the second connection members 44 is alignable with an associated one of the first connection members 42 when the cover 40 is positioned over the ladder 20. Each of the second connection members 44 is complimentary to the associated first connection member 42. Because the first 42 and second connection members 44 are complementary, each of the second connection members 44 is engageable to the associated first connection member 42.

In use, the tailgate is lowered or opened. The cover member is removed by disengaging the second connection members from the first connection members. The cover member is placed aside. The ladder assembly is pivoted relative to the tailgate towards a support surface below the tailgate. Illustrative examples of a support surface include driveways and the ground. The telescopic portions of the slide rails are extended until the feet coupled to the second end of each of the side rails come into contact with the support surface. The locking mechanism is engaged if desired. To store the extendable tailgate ladder assembly this process is simple reversed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tailgate ladder assembly for coupling to a tailgate of a vehicle, said tailgate ladder assembly comprising:

a ladder having a pair of opposite side rails and a plurality of rungs extending between said side rails;

a pair of tracks adapted for coupling to the tailgate of the vehicle, each of said side rails being slidably insertable into an associated one of said pair of tracks whereby said side rails are extendable and retractable relative to said tailgate;

a first end of each of said side rails being pivotally coupled to an associated track connection portion whereby said ladder is pivotable such that a second end of each of said side rails is positionable to abut a support surface below the tailgate such that said rungs for a plurality of steps between the support surface and the tailgate;

each of said side rails having a plurality of telescopic portions, each telescopic portion being slidably engaged to each adjacent telescopic portion such that each said side rail is extendable;

each of said rungs having a connection portion coupled to an interior face of an associated one of said side rails;

said plurality of telescopic portions including a pair of proximal telescopic portions, each proximal telescopic portion being pivotally coupled to an associated one of said connection portions; and said plurality of telescopic portions including a plurality of outer telescopic portions, each outer telescopic portion having a generally C-shaped cross-section whereby said outer telescopic portions are slidable relative to each other such that said connection portions of said rungs are slidable within a gap formed by opposite edges of said outer telescopic portions.

2. The tailgate ladder assembly of claim 1, further comprising:

a pair of feet, each foot being coupled to an associated second end of one of said side rails.

3. The tailgate ladder assembly of claim 1, further comprising:

each of said rungs having a generally arcuate upper surface whereby an uppermost portion of said upper surface is positioned substantially horizontally throughout a range of angles between said tailgate and said ladder when said ladder is pivoted relative to said tailgate.

4. The tailgate ladder assembly of claim 3, further comprising:

said upper surface being covered by a gripping material to prevent slipping on said rungs.

5. The tailgate ladder assembly of claim 1, further comprising:

each outer telescopic portion including a locking pin mechanism for engaging a selectable one of a plurality of holes in an adjacently positioned one of said telescopic portions whereby said telescopic portions are lockable into a static position relative to each other.

6. The tailgate ladder assembly of claim 5, further comprising:

a cover member having an outer perimeter portion adapted for abutting the tailgate such that said cover member is positionable over said ladder when said ladder is in a fully retracted position.

7. The tailgate ladder assembly of claim 6, further comprising:

a plurality of first connection members, said first connection members being coupled to said outer perimeter portion of said cover member; and a plurality of second connection members adapted for coupling to the tailgate of the vehicle such that said each of said second connection members is alignable with an associated one of said first connection members when said cover member is positioned over said ladder, each of said second connection members being complimentary to said associated first connection member whereby each of said second connection member is engageable to said associated first connection member.

8. A tailgate ladder assembly for coupling to a tailgate of a vehicle, said tailgate ladder assembly comprising:

a ladder having a pair of opposite side rails and a plurality of rungs extending between said side rails;

a pair of tracks adapted for coupling to the tailgate of the vehicle, each of said side rails being slidably insertable into an associated one of said pair of tracks whereby said side rails are extendable and retractable relative to said tailgate;

a first end of each of said side rails being pivotally coupled to an associated track connection portion whereby said ladder is pivotable such that a second end of each of said side rails is positionable to abut a support surface below the tailgate such that said rungs form a plurality of steps between the support surface and the tailgate;

a pair of feet, each foot being coupled to an associated second end of one of said side rails;

each of said rungs having a generally arcuate upper surface whereby an uppermost portion of said upper surface is positioned substantially horizontally throughout a range of angles between said tailgate and said ladder when said ladder is pivoted relative to said tailgate;

said upper surface being covered by a gripping material to prevent slipping on said rungs;

each of said side rails being telescopic for extending a length of said ladder;

each of said side rails having a plurality of telescopic portions, each telescopic portion being slidably engaged to each adjacent telescopic portion such that each of said side rails is extendable;

each of said rungs having a connection portion coupled to an interior face of an associated one of said side rails;

said plurality of telescopic portions including a pair of proximal telescopic portions, each proximal telescopic portion being pivotally coupled to an associated one of said connection portions;

said plurality of telescopic portions including a plurality of outer telescopic portions, each outer telescopic portion having a generally C-shaped cross-section whereby said outer telescopic portions are slidable relative to each other such that said connection portions of said rungs are slidable within a gap formed by opposite edges of said outer telescopic portions;

each outer telescopic portion including a locking pin mechanism for engaging a selectable one of a plurality of holes in an adjacently positioned one of said telescopic portions whereby said telescopic portions are lockable into a static position relative to each other;

a cover member having an outer perimeter portion adapted for abutting the tailgate such that said cover member is positionable over said ladder when said ladder is in a fully retracted position;

a plurality of first connection members, said first connection members being coupled to said outer perimeter portion of said cover member; and a plurality of second connection members adapted for coupling to the tailgate of the vehicle such that said each of second connection members is alignable with an associated one of said first connection members when said cover member is positioned over said ladder, each of said second connection members being complimentary to said associated first connection member whereby each of said second connection member is engageable to said associated first connection member.

9. A tailgate ladder assembly for coupling to a tailgate of a vehicle, said tailgate ladder assembly comprising:

a ladder having a pair of opposite side rails and a plurality of rungs extending between said side rails;

a pair of tracks adapted for coupling to the tailgate of the vehicle, each of said side rails being slidably insertable into an associated one of said pair of tracks whereby said side rails are extendable and retractable relative to said tailgate;

a first end of each of said side rails being pivotally coupled to an associated track connection portion whereby said ladder is pivotable such that a second end of each of said side rails is positionable to abut a support surface below the tailgate such that said rungs form a plurality of steps between the support surface and the tailgate;

each of said side rails having a plurality of telescopic portions, each telescopic portion being slidably engaged to each adjacent telescopic portion such that each said side rail is extendable;

each of said rungs having a connection portion coupled to an interior face of an associated one of said side rails;

said plurality of telescopic portions including a pair of proximal telescopic portions, each proximal telescopic portion being pivotally coupled to an associated one of said connection portions;

said plurality of telescopic portions including a plurality of outer telescopic portions, each outer telescopic portion having a generally C-shaped cross-section whereby said outer telescopic portions are slidable relative to each other such that said connection portions of said rungs are slidable within a gap formed by opposite edges of said outer telescopic portions; and a tailgate assembly being substantially hollow, said tailgate assembly being adapted for retrofitting onto an existing pickup truck as a replacement for an existing tailgate, said tailgate assembly having an interior face, said pair of tracks being coupled to said interior face such that said ladder is extendable from said tailgate assembly when said tailgate assembly is in an open position, said ladder being stored within said tailgate assembly when said tailgate assembly is in a closed position for safe transportation of said ladder and to prevent said ladder from accidentally being separated from the pickup truck when the pickup truck moves.

\* \* \* \* \*